United States Patent
Edgar

[11] 3,720,916
[45] March 13, 1973

[54] VEHICLE DETECTION AND INDICATION APPARATUS FOR OVERHEAD OBSTRUCTIONS

[75] Inventor: William H. Edgar, Pittsburgh, Pa.

[73] Assignee: Exhibitors Service Company, McKees Rocks, Pa.

[22] Filed: Oct. 21, 1971

[21] Appl. No.: 191,411

[52] U.S. Cl. ................................340/61, 200/61.44
[51] Int. Cl. ............................................G08b 21/00
[58] Field of Search..................340/52, 61, 258, 282; 200/61.42, 61.44

[56] References Cited

UNITED STATES PATENTS

| | | | |
|---|---|---|---|
| 2,214,685 | 9/1940 | Stone, Jr. | 340/61 |
| 2,834,002 | 5/1958 | Nordseik | 340/61 |
| 3,232,265 | 2/1966 | Hurt | 340/61 X |

*Primary Examiner*—Alvin H. Waring
*Attorney*—Hymen Diamond

[57] ABSTRACT

Apparatus indicates damage to the roof of a vehicle from an overhead obstruction under which the vehicle has been moved and also for identifying the operator of the vehicle who is responsible for the damage. The roof of the vehicle is provided with feelers front and rear. Each feeler is connected to a toggle switch which is actuated from a standby setting to an actuated setting when its associated feeler is actuated by an obstruction under which the vehicle has moved. In the standby setting each switch closes a circuit through a standby visual signal which indicates that the apparatus is in proper operating condition. In the actuated setting each switch closes a circuit through a visual signal which indicates that the roof of the vehicle has engaged an obstruction. The switches are connected in parallel to the visual signals so that actuation of either feeler produces the engagement-indicating visual signal. The actuated switch can only be reset from the actuated setting to the standby setting by a key or the like which is in the custody of the supervisor or dispatcher who can assign guilt of causing the damage when he dispatches the vehicles to the next destination.

11 Claims, 6 Drawing Figures

PATENTED MAR 13 1973  3,720,916

VEHICLE DETECTION AND INDICATION APPARATUS FOR OVERHEAD OBSTRUCTIONS

BACKGROUND OF THE INVENTION

This invention relates to the art of detecting and indicating the engagement of moving vehicles with obstructions and has particular relationship to the detection and indication that the outer surface of a vehicle has engaged an obstruction. Specifically, this invention concerns itself with the engagement of the roof of a trailer with an obstruction, for example, the overhead structure of a garage or overhang into which the trailer is moved or backed. In the interest of concreteness, the following discussion and description will deal with this aspect of this invention.

Typical of the teachings of the prior art are Nordsiek U.S. Pat. No. 2,834,002 "Height Clearance Feeler Device" and Kramer U.S. Pat. No. 2,894,087 "Vehicle Roof Clearance Signal Means." In arriving at this invention it has been realized that the teachings of these patents and of other related prior art do not meet the real problems with which the owners and operators of tractor-trailer units are confronted.

The damage to a shipment or to the trailer which occurs when the roof of a trailer strikes an obstruction is costly, frequently amounting to thousands of dollars. It is then necessary that these drivers at fault for the collision be identified so that they may be charged for the loss and remedial action taken against them. Many, if not most, tractor-trailer drivers are members of locals of the Teamster's Union and, in attempts to assess damage against these drivers and to take remedial action against them, it is necessary to identify the guilty driver by adequate proof in a quasi-judicial grievance procedure. The mere showing that damage has occurred days or weeks after a driver has operated a trailer is not adequate proof that this driver was the guilty one. The above-cited and related prior art does not meet the problem which is here described. Typically, all that happens is that the driver is warned that a collision has occurred and he disables the warning signal and leaves. Later, when the damage is discovered, the driver denies that he is at fault. It is to be borne in mind that unless there is a reliable indication of damage the dispatcher may not know that damage has occurred on dispatching the vehicle to the next destination. The damage is then discovered long after it occurs.

It is an object of this invention to overcome the above-described deficiencies of the prior art and to provide apparatus and a method for signaling and indicating that damage from engagement with an obstruction has occurred to the wall of a vehicle, in whose use and practice, fault for causing the damage shall be readily ascertainable.

SUMMARY OF THE INVENTION

In accordance with this invention a signal is enabled and locked in on the engagement of the outer surface of a vehicle with an obstruction. The locked-in signal can only be reset by unlocking a lock with a key or the like, in the custody of, or operating a combination, known to, the supervisor or dispatcher. The locked-in signal is readily visible to a dispatcher about to dispatch the vehicle on the trip following the damage and he is able to fix the blame for the damage because his records show the name of the driver who last drove the vehicle.

Specifically, the roof of a trailer is provided with feelers front and rear. Each feeler is connected to a toggle switch mechanism which is normally set to energize a standby signal thus indicating that the apparatus is in proper operation. When either feeler encounters an obstruction, the corresponding toggle mechanism is actuated and locked in, energizing a signal indicating a collision. The actuated mechanism and signal can only be reset by unlocking a lock with a key or the like.

BRIEF DESCRIPTION OF THE DRAWING

For a better understanding of this invention, both as to its organization and as to its method of operation, together with additional objects and advantages thereof, reference is made to the following description, taken in connection with the accompanying drawing, in which.

DETAILED DESCRIPTION OF EMBODIMENT

Figure 2:
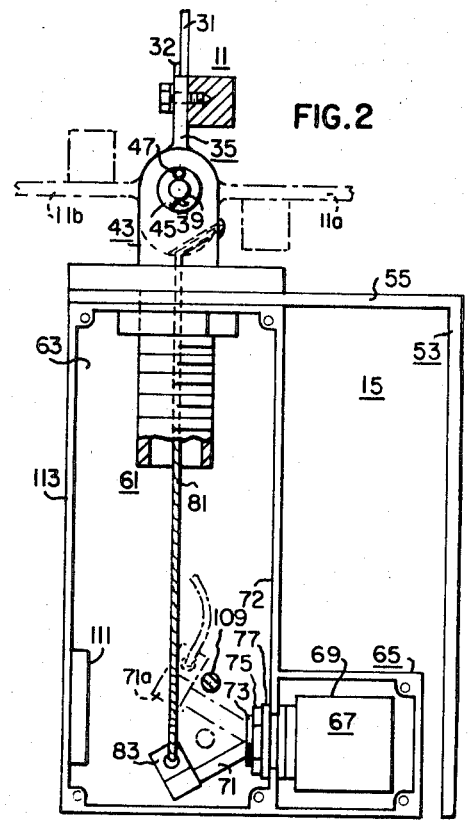
FIG. 2 is a view in side elevation (as viewed from the right side of the vehicle shown in FIG. 1) and partly in section, showing the switching mechanism used in the practice of this invention with the cover and parts attached to the cover removed.

The apparatus showing in the drawing includes feeler assemblies 11 and 13, switch units 15 and 17 (only 15 shown structurally) associated with each feeler 11 and 13 and an indicator unit 19 common to the feeler-switch pairs. The feeler assemblies 11 and 13 are pivotally mounted, front and rear, on the roof 21 of a trailer 23 in a position such that their feelers are actuated when the trailer 23 collides with an overhead structure towards which it is being moved. On such actuation the associated switch unit 15 or 17 is actuated and locked in and the indicator unit is actuated and locked in to indicate the collision.

Each feeler assembly 11, 13 includes a strip 31 of flexible material such as rubber secured to a stiff backup strip 32 of metal or the like. The strip 32 is secured on brackets 33 and 35. Each bracket 33, 35 is pivotally mounted on a pin 37, 39 held in the clevis 41, 43 by a washer 45 and a cotter pin 47. Each clevis 41 is supported on an angle bracket 51 and each clevis 43 on an angle bracket 53. The brackets 51 and 53 are secured to the front and rear walls of the trailer 23 so that the strips 31 extend a short distance above the top of the trailer and when one of the strips 31 engages an obstruction near the roof 21 of the trailer 23 the feeler 31–32 is pivoted turning the associated brackets 33 and 35 with it.

Figure 6:
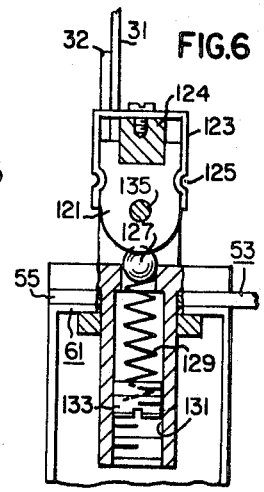
FIG. 6 is a fragmental view partly in section and partly in side elevation of a modification of this invention.

FIG. 6 shows a feeler assembly in which the feeler 31 and bar 32 are at each end removably secured to a pivoting bracket 121 by a resilient clevis 123 or spring, with notches 125 to engage cooperative indentations in the bracket 121. The clevis 123 is secured to a block 124 to which the feeler 31–32 is secured. The block 124 engages the bracket 121 in a rectangular notch. Each bracket 121 is pivotal about a ball 127 urged into engagement with the bottom of the bracket by a compression spring 129 extending through an internally threaded tube 131 penetrating and secured to the top of housing 61, and the top 55 of bracket 53. The compression of the spring 129 may be set by a disc 133 which may be screwed into the tube. When an obstruction engages strip 31 the bracket is turned about pin 135 with the ball 127 as a pivot. Continued engagement with the obstruction while the vehicle 23 is moving causes the clevis 123 and strips 31 and 32 and block 124 to be disengaged from the bracket 121 and prevents damage to the feeler 31–32.

Figure 3:
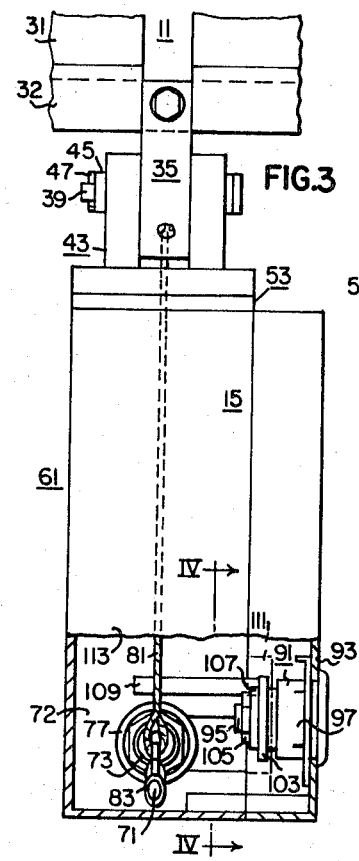
FIG. 3 is a view partly in section and partly in side elevation (as viewed from the end of the vehicle shown in FIG. 1) of the mechanism shown in FIG. 2.
Figure 4:
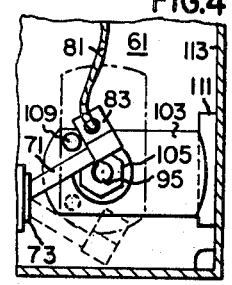
FIG. 4 is a fragmental view in section taken along line IV—IV of FIG. 3.
Figure 5:
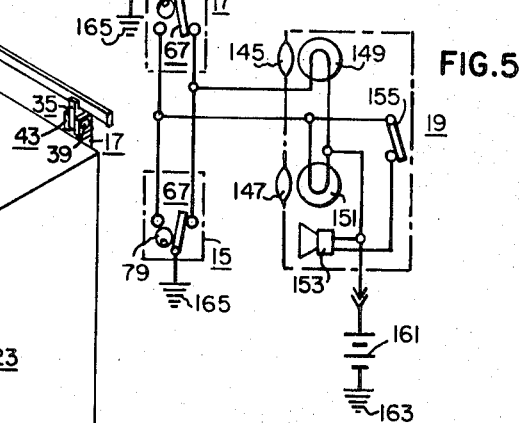
FIG. 5 is a schematic of the circuit of this invention.

A switch assembly 15 or 17 is suspended from the horizontal arm 55 of each angle bracket 53. Each switch assembly 15, 17 (FIGS. 2, 3, 4) includes a housing 61 having an elongated chamber 63 secured to the shelf 55 and a chamber 65 extending at right angles to the chamber 63 in the lower part of the housing. A toggle switch 67 is mounted with its operating mechanism 69 and terminals in the housing 65 and its actuating arm 71 in the housing 63. The switch 67 has a hollow threaded sleeve 73 through which the arm 71 extends and is secured to the wall 72 bounding chambers 63 and 65 by a nut 75 screwed into the sleeve and a washer 77. The toggle mechanism of the switch 67 is conventional and may be a cam 79 as shown in FIG. 5 or a dead-center linkage. The arm 71 is operable by a cable 81 connected at the lower end to an eyelet 83 mounted on the end of the arm 71 and at the upper end secured to the pivotal bracket 35. When the strip 31–32 is engaged by an obstruction the assembly 11 or 13 is pivoted in either direction to the positions 11a or 11b (FIG. 2). The bracket 35 is turned so as to raise the cable 81 and set the arm 71 in position 71a. In this position the switch 67 is actuated.

Each lock mechanism 91 for unlocking the switch 67 from its locked position is mounted on a wall 93 of housing 61 which is at right angles to the plane in which the arm 71 is moved to position 71a by the cable 81. This mechanism 91 includes a barrel 95 rotatable by rotation of a key (not shown) extending through an opening in wall 93 and held against wall 93 between a retaining clevis 97 and a shoulder 99 within which the barrel is rotatable. A threaded stud 101 extends from the end of the barrel and a strip 103 (of metal or the like) is secured to the barrel by a nut 105 screwed onto the stud 101 and by a washer 107. The strip 103 is rotatable with the barrel 95. A pin 109 extends from a corner of the strip 103 in a position such as to engage and rotate the arm 71 in actuated position when the barrel 95 is turned by a key.

An L-shaped strip 111 is secured to wall 113 of the housing 61. The toe of this strip 111 perpendicular to the wall 113 extends over the strip 103 when it is in standby (locking position). If an attempt is made to move the strip 103 and its associated parts outwardly to dismantle the apparatus, the outward movement of the strip 103 is prevented by strip 111.

Figure 1:
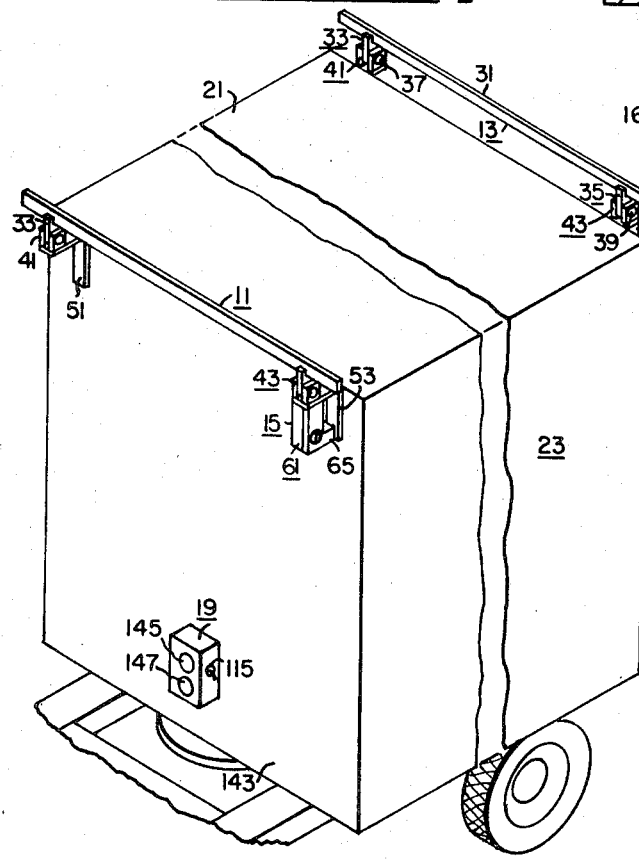
FIG. 1 is a view in perspective showing a vehicle which embodies this invention.

The indicator 19 (FIGS. 1 and 5) includes a housing 141 mounted on the wall 143 of the trailer. The container 141 has lenses 145 and 147 of different colors; for example, orange and red. Behind the lenses are lamps 149 and 151 respectively. Typically, the lamp 149 is behind an orange lens and the lamp 151 behind a red lens. There is also a sound-signaling horn 153 in the housing 141 and a switch 155 for disconnecting the horn extends from the housing.

The switches 15 and 17 and 155 and the lamps 149 and 151 are connected in a circuit (FIG. 5) including a battery 161 which may be the battery of the tractor. The necessary wiring is provided within the trailer 23 and the battery 161 is connected in the circuit when the trailer 23 is hooked to a tractor (not shown).

In normal standby condition (FIG. 5 is shown in standby) the switches 15 and 17 are set to energize lamp 149. A standby signal then is seen through lens 145 and this signal shows that the apparatus is in proper operating condition. Switch 155 is at this time closed but horn 153 is deenergized. When a feeler 31–32 engages an obstruction, cable 81 is pulled upwardly actuating the associated switch assembly 15 or 17. Assume that assembly 15 is actuated. The following circuits are closed: ground 163, battery 161, lamp 151, switch 67 of assembly 15, ground 165; and ground 163, battery 161, horn 153, switch 155, switch 67, ground 165. The lamp 151 is energized indicating an abnormal condition through lens 147. In addition, the horn 153 sounds. The operator can turn off the horn 153 by opening switch 155. However, lamp 151 remains energized and will reveal that the trailer has been damaged by the last operator when the dispatcher sees the signal before dispatching the trailer to its next destination. Before dispatching the trailer the dispatcher inspects the damage. Then he operates the lock 91 turning the barrel 95 and rotating pin to position 109a (FIG. 4). The switch assembly 15 (or 17) is reset. The dispatcher then turns the key returning the pin to position 109 and the apparatus is reset, blame for the damage having been fixed.

While preferred embodiments of this invention have been disclosed herein, many modifications thereof are feasible. This invention, then, is not to be restricted except insofar as is necessitated by the spirit of the prior art.

I claim:

1. A vehicle body having feeler means on an external surface thereof whose clearance from an obstruction cannot readily be seen by the operator of said vehicle, indicator means on actuation providing an indication distinguishing between unobstructed positioning of said surface of said vehicle and positioning of said surface of said vehicle in engagement with an obstruction, switching mechanism having an unactuated setting and an actuated setting and being normally in its unactuated setting and on actuation being set in its actuated setting, means connected to said switch mechanism actuable on said actuation of said mechanism to lock said mechanism in its said actuated setting, means connecting said switch mechanism to said indicator means while said mechanism is in unactuated setting to maintain said indicator means unactuated and to actuate said indicator means to provide said indication on actuation of said mechanism to its actuated setting, said indicator means remaining so actuated so long as said mechanism remains locked in said actuated setting, and means responsive to said feeler means on obstructed positioning of said surface of said vehicle for actuating said mechanism.

2. The vehicle of claim 1 wherein the feeler means includes a first feeler near the front of the vehicle and a second feeler near the rear of the vehicle and wherein the switch mechanism includes a first switch connected to said first feeler to be actuated on actuation of said first feeler and a second switch connected to said second feeler to be actuated by said second feeler on actuation of said second feeler, the said vehicle also including circuit means connecting said first and second switches in parallel with the indicator so that said indicator is actuated on actuation of either of said switches.

3. The vehicle of claim 1 wherein the feeler means is on the roof of the vehicle and is actuated on engagement with an obstruction above the roof of the vehicle.

4. The vehicle of claim 1 including lock means connected to the switching mechanism operable by a key or the like for resetting, in its unactuated setting, said switching mechanism after it has been set in its actuated setting.

5. The vehicle of claim 1 wherein the switching mechanism is actuable by an arm connected to the feeler through a flexible cable.

6. The vehicle of claim 1 wherein the indicator means includes a first indicator operable in the unactuated setting of said indicator means indicating the standby readiness of the switch mechanism and its cooperative relationship with said indicator means and a second indicator indicating actuated setting of said indicator means on engagement of the surface of the vehicle with an obstruction.

7. The vehicle of claim 6 including a third indicator actuable on actuation of the indicator means and readily resettable by the operator of the vehicle, indicating engagement of the surface of the vehicle with an obstruction.

8. The vehicle of claim 1 wherein the switch mechanism includes switch means in a container mounted on the vehicle, the said switch mechanism also including means preventing removal of said switch in the unactuated setting of said mechanism.

9. The vehicle of claim 8 wherein the switch includes an actuating arm and the removal-preventing means includes a plate having a pin extending therefrom, said plate being set in removal preventing setting by engagement of said arm and said pin when said arm is moved to reset said switch from actuated setting to unactuated setting.

10. The vehicle of claim 4 wherein the switch mechanism includes a toggle switch having an actuating arm and the lock means includes a pin which is rotated by turning of the key in the lock means, said pin engaging said arm and resetting said switch.

11. The vehicle of claim 1 having feeler means including a feeler which is removably secured to its mounting so that continued engagement of the feeler and an obstruction while said vehicle is moving disengages the feeler from its mounting instead of damaging the feeler.

* * * * *